(12) United States Patent
Maeda et al.

(10) Patent No.: US 7,586,635 B2
(45) Date of Patent: Sep. 8, 2009

(54) METHOD AND APPARATUS FOR SECURE PRINTING USING FACIAL RECOGNITION OF A PRINT JOB SENT BY THE USER OVER A DISTRIBUTED PRINTING NETWORK THAT EMPLOYS A SERVER CONTAINING REGISTRATION, FACIAL DATA, AND USER IDENTIFICATION INFORMATION

(75) Inventors: Masahiro Maeda, Kanagawa (JP); Noriji Kato, Kanagawa (JP); Hitoshi Ikeda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 893 days.

(21) Appl. No.: 11/144,598

(22) Filed: Jun. 6, 2005

(65) Prior Publication Data

US 2006/0092455 A1 May 4, 2006

(30) Foreign Application Priority Data

Nov. 2, 2004 (JP) ............................. 2004-318939

(51) Int. Cl.
*G06F 15/00* (2006.01)
(52) U.S. Cl. ..................... 358/1.15; 358/1.1; 358/1.6
(58) Field of Classification Search ....... 358/1.11–1.16; 709/203; 382/115–118, 124
See application file for complete search history.

(56) References Cited

U.S. PATENT DOCUMENTS

| | | | |
|---|---|---|---|
| 6,307,640 B1 | 10/2001 | Motegi | |
| 6,631,008 B2* | 10/2003 | Aoki | ......................... 358/1.15 |
| 7,460,692 B2* | 12/2008 | Mizutani et al. | ............ 382/118 |
| 2002/0034319 A1* | 3/2002 | Tumey et al. | ............... 382/116 |
| 2002/0105666 A1* | 8/2002 | Sesek | ......................... 358/1.14 |

(Continued)

FOREIGN PATENT DOCUMENTS

JP     A-06-059010     3/1994

(Continued)

OTHER PUBLICATIONS

Internet X.509 Public Key Infrastructure (PKI) Proxy Certificate Profile, dated Jun. 2004, available from <http://www.ietf.org/rfc/rfc3820.txt>, accessed Jan. 5, 2009.*

*Primary Examiner*—Kimberly A Williams
(74) *Attorney, Agent, or Firm*—Oliff & Berridge, PLC

(57) ABSTRACT

An information output system includes a user terminal that issues a print job containing print data, a management server that receives and stores the print job, and an information output unit that acquires print data from the management server and executes printout. The user terminal transmits a print job specifying a print reception user of a print data recipient. The management server includes a print job processing section that stores and manages the print job in association with a user identifier of the print reception user, and a user authentication section that receives the user image information and executes user authentication based on comparison processing between the received user image information and registered user image information stored in a user information database. Provided that the user is authenticated, the print job processing section acquires print job data with the authenticated user set as the print reception user and transmits the print job data.

26 Claims, 11 Drawing Sheets

U.S. PATENT DOCUMENTS

2005/0275866 A1* 12/2005 Corlett .................... 358/1.14
2006/0066891 A1* 3/2006 Ikeda et al. ............... 358/1.15

FOREIGN PATENT DOCUMENTS

| JP | A-2002-111924 | 4/2002 |
| JP | A-2002-132733 | 5/2002 |
| JP | A 2002-149549 | 5/2002 |

* cited by examiner

FIG. 4A

USER INFORMATION

| USER ID | REGISTERED DATA FOR USER AUTHENTICATION |
|---|---|
| u01ab88761 | 😀 |
| u0223cda2 | 🙂 |
| ⋮ | ⋮ |

FIG. 4B

PRINT INFORMATION

| USER ID | PRINT JOB REGISTRATION DATA | EXPIRATION DATE |
|---|---|---|
| u01ab88761 | Pjob-1234 | 2004,11,03 |
| u0223cda2 | Pjob-abcd | 2004,11,11 |
| ⋮ | ⋮ | ⋮ |

FIG. 8
USER INFORMATION
| USER ID | REGISTERED DATA FOR USER AUTHENTICATION | PRESENCE/ ABSENCE OF PROXY CERTIFICATE | PROXY CERTIFICATE |
|---|---|---|---|
| u01ab88761 | 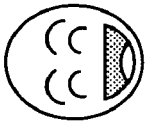 | PRESENCE |  |
| u0223cda2 | 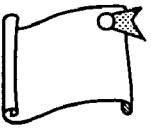 | ABSENCE | |
| ⋮ | ⋮ | ⋮ | ⋮ |

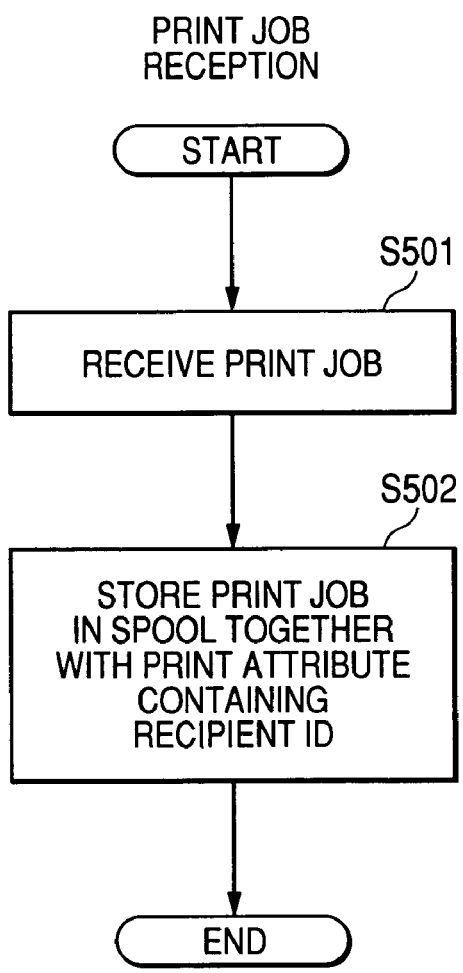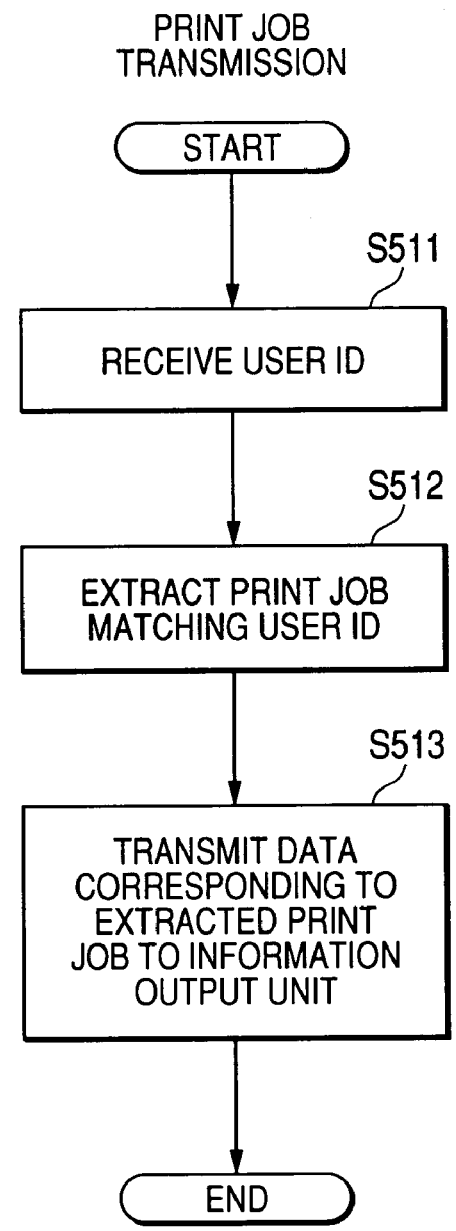

METHOD AND APPARATUS FOR SECURE PRINTING USING FACIAL RECOGNITION OF A PRINT JOB SENT BY THE USER OVER A DISTRIBUTED PRINTING NETWORK THAT EMPLOYS A SERVER CONTAINING REGISTRATION, FACIAL DATA, AND USER IDENTIFICATION INFORMATION

BACKGROUND OF THE INVENTION

1. Field of the Invention

This invention relates to an information output system, an information processing apparatus, an information processing method, and a computer program and more particularly to an information output system, an information processing apparatus, an information processing method, and a computer program for identifying the user by performing user authentication processing based on the face of the user and executing data output of print data, etc., corresponding to the identified user on a printer connected through a network, etc.

2. Description of the Related Art

In recent years, data communications using a network such as the Internet or an intranet have been brisk. For example, in an office, etc., a printer, a copier, and the like are connected through a network for outputting a print job from PCs, etc., of user terminals of a large number of users. Further, in recent years, a multifunction device (MFD) including various data processing functions and network communication processing function as well as the functions of a printer, a copier, a scanner, etc., have been used in various fields.

For example, in an office of a given size, etc., a large number of user terminals are connected to plural network printers and print processing of a print job issued by the user with specification of the output printer, namely, the output destination can be executed.

However, processing for the user to select and specify one from among a large number of printers as the output destination also increases the load on the user. An art of solving this problem is described in JP-A-2002-149549, for example. The system described in JP-A-2002-149549 is a system wherein in a configuration in which a large number of network-connected printers exist, a print job issued by the user is once stored in a database managed by a central control section and then the user moves to any of the network-connected printers and enters the identification information of the print job already issued, such as the print job ID, and when the control section receives the entered information, the print data of the print job is transmitted to the printer to which the user moves for output.

However, in the configuration, the print requester needs to specify the job ID, such as a pass code, and the user needs to bear the job ID in mind or make a note of the job ID and carry the note. Since it is assumed that the printer requester is the job transmitter, if the transmitter and the recipient differ, the job ID needs to be transmitted from the job transmitter to the print requester using any other unit, this involves a problem of inefficiency.

SUMMARY OF THE INVENTION

The invention provides an information output system, an information processing apparatus, an information processing method, and a computer program for making it possible to produce output required by the user from a printer connected through a network by executing precise user identification processing without increasing the load on the user without using identification information of the job ID corresponding to a print job, etc.

According to a first aspect of the invention, there is provided an information output system including a user terminal that issues a print job containing print data, a management server that receives and stores the print job issued by the user terminal, and an information output unit that acquires print data from the management server and executes printout. Preferably, the user terminal, the management server, and the information output unit are connected through a network. The user terminal transmits a print job specifying a print reception user of a print data recipient to the management server. The information output unit includes a camera that acquires user image information, a communication section that transmits the user image information acquired by the camera to the management server, and a print section that executes printout. The management server includes a print job processing section that stores and manages the print job received from the user terminal in a print information database in association with a user identifier of the print reception user, and a user authentication section that receives the user image information from the information output unit and executes user authentication based on comparison processing between the received user image information and registered user image information associated with a registered user stored in a user information database. Provided that the user is authenticated in the user authentication section, the print job processing section executes processing of acquiring print job data with the authenticated user set as the print reception user from the print information database and of transmitting the print job data to the information output unit.

Further, according to a second aspect of the invention, there is provided an information output unit that acquires print data from a management server connected to the information output unit through a network and executes printout, the information output unit including a control section that executes data processing, a camera that acquires user image information, a communication section that executes data communications, a print section that executes printout, and a data input/output section as a user interface. Preferably, the control section transmits the user image information acquired by the camera to the management server, sends a request for acquiring print job data with a user identifier set as the print recipient to the management server provided that the user identifier of an authenticated user is received from the management server, and executes output processing of the print job data received from the management server based on the request through the print section.

Further, according to a third aspect of the invention, there is provided an information processing apparatus as a management server that receives a print job from a user terminal connected to the information processing apparatus through a network, and transmits print job data to an information output unit connected to the information processing apparatus through the network, the information processing apparatus including a print job processing section that stores and manages the print job received from the user terminal in a print information database in association with a user identifier of a print reception user, and a user authentication section that receives user image information from the information output unit and executes user authentication based on comparison processing between the received user image information and registered user image information associated with a registered user stored in a user information database. Preferably, provided that the user is authenticated in the user authentication section, the print job processing section executes processing of acquiring print job data with the authenticated user set as the print reception user from the print information database and of transmitting the print job data to the information output unit.

Further, according to a fourth aspect of the invention, there is provided an information processing method in an information output unit that acquires print data from a management server connected to the information output unit through a network and executes printout, the information processing method including acquiring user image information by a camera that acquires user image information, transmitting the acquired user image information to the management server, sending a request for acquiring print job data with a user identifier set as the print recipient to the management server, provided that the user identifier of an authenticated user is received from the management server, and executing printout processing of the print job data received from the management server based on the request.

Further, according to a fifth aspect of the invention, there is provided an information processing method in an information processing apparatus as a management server that receives a print job from a user terminal connected to the information processing apparatus through a network and transmits print job data to an information output unit connected to the information processing apparatus through the network, the information processing method including storing and managing the print job received from the user terminal in a print information database in association with a user identifier of a print reception user, receiving user image information from the information output unit, executing user authentication based on comparison processing between the received user image information and registered user image information associated with a registered user stored in a user information database, acquiring print job data with the authenticated user set as the print reception user from the print information database, provided that the user is authenticated in the executing user authentication, and transmitting the print job data to the information output unit.

Further, according to a sixth aspect of the invention, there is provided a computer program for causing a computer to execute information processing in an information output unit that acquires print data from a management server connected to the information output unit through a network and executes printout, the computer program including acquiring user image information by a camera that acquires user image information, transmitting the acquired user image information to the management server, sending a request for acquiring print job data with a user identifier set as the print recipient to the management server, provided that the user identifier of an authenticated user is received from the management server, and executing printout processing of the print job data received from the management server based on the request.

Further, according to a seventh aspect of the invention, there is provided a computer program for causing a computer to execute information processing in an information processing apparatus as a management server that receives a print job from a user terminal connected to the information processing apparatus through a network and transmits print job data to an information output unit connected to the information processing apparatus through the network, the computer program including storing and managing the print job received from the user terminal in a print information database in association with a user identifier of a print reception user, receiving user image information from the information output unit, executing user authentication based on comparison processing between the received user image information and registered user image information associated with a registered user stored in a user information database, acquiring print job data with the authenticated user set as the print reception user from the print information database, provided that the user is authenticated in the executing user authentication, and transmitting the print job data to the information output unit.

BRIEF DESCRIPTION OF THE DRAWINGS

Embodiments of the present invention will be described in detail based on the following figures, wherein:

In the accompanying drawings:

FIGS. 4A and 4B are drawings to describe the data compositions of databases included in the management server;

FIG. 8 is a drawing to describe the data composition of a database for managing proxy certificate in the management server;

FIGS. 9A and 9B are flowcharts to describe input and output processing of a print job in the management server;

DETAILED DESCRIPTION OF THE INVENTION

Figure 1:
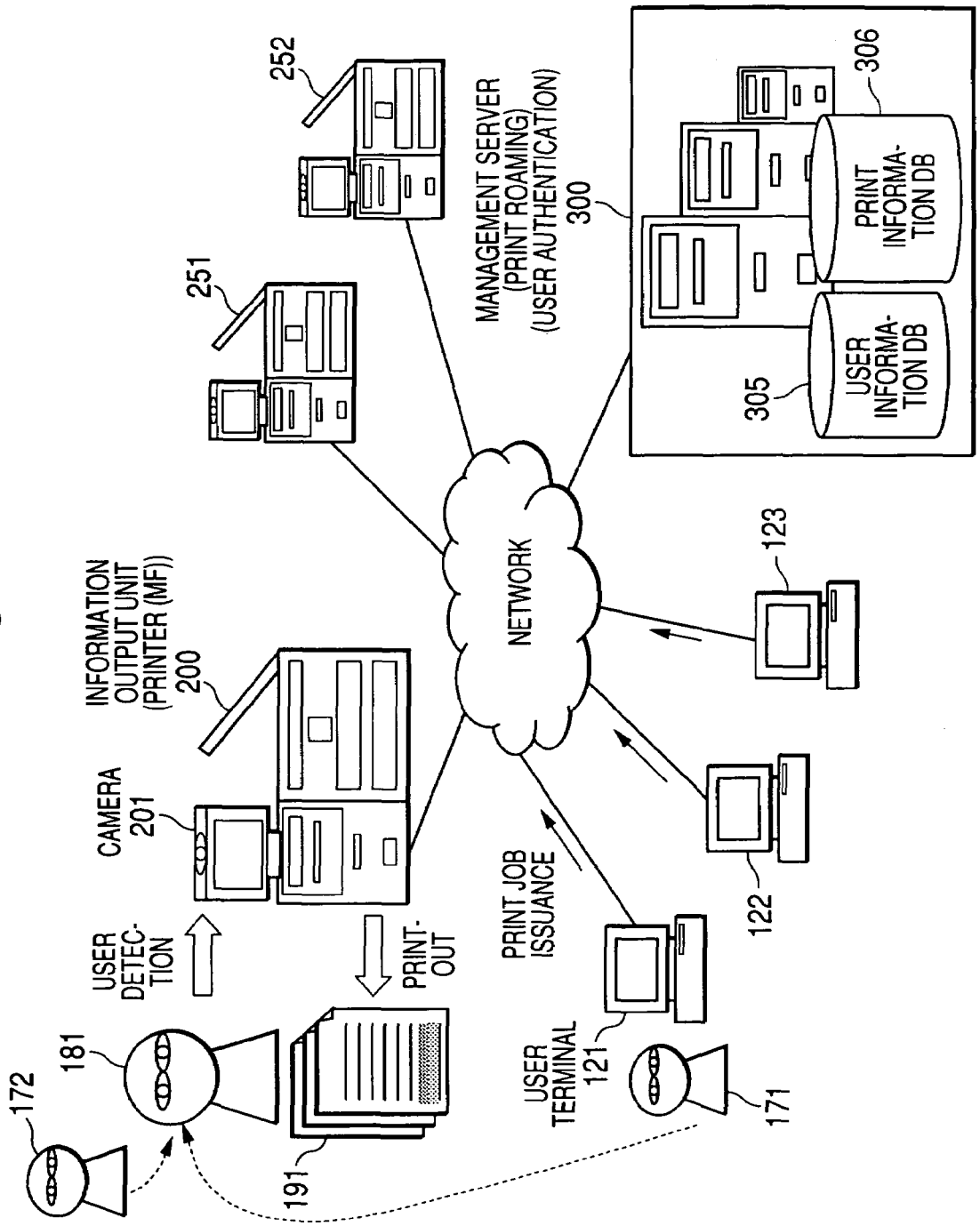
FIG. 1 is a drawing to describe the generation configuration of an information output system of the invention.

Details of an information output system, an information processing apparatus, an information processing method, and a computer program of the invention will be discussed with reference to the accompanying drawings. First, the configuration and an outline of the information output system of the invention will be discussed with reference to FIG. 1. As shown in FIG. 1, the information output system of the invention has user terminals 121 to 123 such as PCs of print processing request terminals and print job issuers, information output units 200, 251, and 252 for executing print processing, and a management server 300 for executing spool processing as print job management processing, namely, print roaming service processing such as print data reception, storage, and print data transmission processing responsive to a request and user authentication processing. The components are connected through a network.

An outline of the information output system of the invention will be discussed with reference to FIG. 1. A print job issuing user 171 generates data to be printed in his or her user terminal 121, for example, and transmits the generated data to the management server 300 as print request data, namely, a print job. At this point in time, the print job issuing user 171 does not specify a printer as the printout destination, but transmits data (metaphor, GUI) for specifying the recipient of the print data, namely, a print reception user 181 to the management server 300 as print attribute data. The recipient specification data (metaphor, GUI) may be the user ID of the print data recipient, it may be any data if the data can identify the user based on registration information in the management server 300. The print reception user 181 may be the same as the print job issuing user 171 or may be a different user 172.

The management server 300 stores the print job received from the user terminal 121 in a print information database 306 in association with the user ID of the print reception user. The data structure of the print information database 306 is described later with reference to FIGS. 4A and 4B. The user ID stored in the print information database 306 is the user ID of the printout reception user, namely, the print reception user 181. The management server 300 thus manages the user ID of the print reception user 181 and the print data corresponding to the print job in association with each other.

After the print job is issued, the print reception user 181 comes near any of the network-connected information output unit 200, 251, or 252. The information output unit 200 is provided with a camera for taking a photograph of an image containing the face of the print reception user 181 to receive printout. The photograph image data of the print reception user 181 is transmitted to the management server 300 through the network. The management server 300 executes user authentication processing based on the received face image data of the user. The face image data is data involved in an invasion of privacy and therefore to transfer the data through the network, preferably the data is transferred as encrypted data. Specifically, encrypted communications of SSL (Secure Socket Layers), IPsec, etc., for example, are applied.

The management server 300 stores the previously registered user IDs of the registered users and previously registered face image data in a user information database 305. The management server 300 executes comparison processing between the face image data stored in the user information database 305 and the face image data received from the information output unit 200, namely, the face image data of the print reception user 181. If match image data is found, it is determined that the print reception user 181 is the registered user, namely, it is determined that the user is authenticated. In the authentication processing, plural candidates may be extracted. The processing is described later in detail.

If the user is authenticated, the management server 300 notifies the information output unit 200 that the user is authenticated. Upon reception of the notification, the information output unit 200 inquires of the user 171 whether or not print is to be executed. This inquiry is executed as processing of displaying a message inquiring whether or not print is to be executed in a UI provided in a console box of the information output unit 200 and receiving user's entry (Yes or No). If the print reception user 181 enters a print request, the information output unit 200 notifies the management server 300 that a print request is made.

The management server 300 extracts the print data corresponding to the print job associated with the user ID of the authenticated user from the print information database 306, and transmits the print data to the information output unit 200. The information output unit 200 outputs the data received from the management server 300. The data is printout data 191 shown in FIG. 1. The user 181 receives the printout data 191 and the processing sequence is complete. The information output unit 200 may be not only a unit having a printer function, but also a multifunction (MF) copier having multiple functions of a scanner, a facsimile, etc.

As described above, in the configuration of the invention, the print job transmitter, namely, the print job issuer 171 transmits the data specifying the print data recipient (metaphor, GUI) together with the print data from any of the user terminals 121 to 123 to the management server 300 as the print attribute data. The recipient specification data (metaphor, GUI) may be the user ID of the print data recipient, it may be any data if the data can identify the user based on registration information in the management server 300.

The management server 300 inputs the print job into print roaming service together with the recipient ID. An expiration date is set in the print job. The management server 300 may set or change the print expiration date as required. Unless otherwise changed, the print expiration date set in the print roaming service is applied as the default expiration date. The print roaming service in the management server 300 abstracts the print job received from any of the user terminals 121 to 123 like printXchange and spools the print job, and retains the print job in association with the ID information of the print data recipient. Provided that the print reception user 181 is authenticated, the information output unit 200 inquires of the print roaming service of the management server 300 whether or not the print job corresponding to the print job recipient exists. If the job exists, the information output unit 200 displays a dialog indicting the presence of the print job on a console panel, requesting the user to enter print=Yes or No. If the user enters print=Yes, the information output unit 200 sends a request for transferring the data corresponding to the print job to the print roaming service of the management server 300.

The outline of the processing sequence executed in the information output system of the invention has been described. The configurations of the components making up the information output system of the invention and details of processing will be discussed below with reference to FIGS. 2 to 11.

Figure 2:
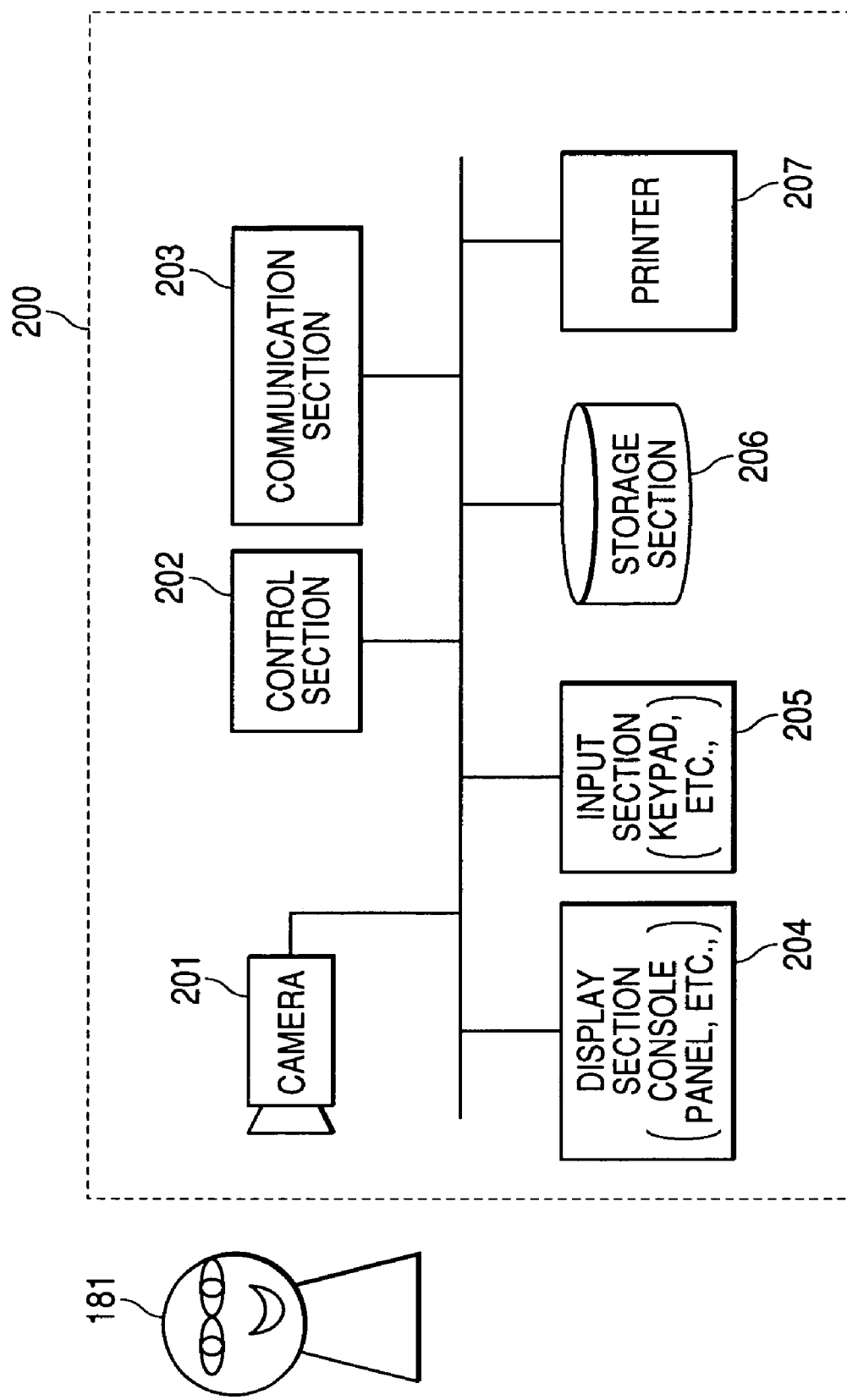
FIG. 2 is a block diagram to describe the configuration of an information output unit.
Figure 3:
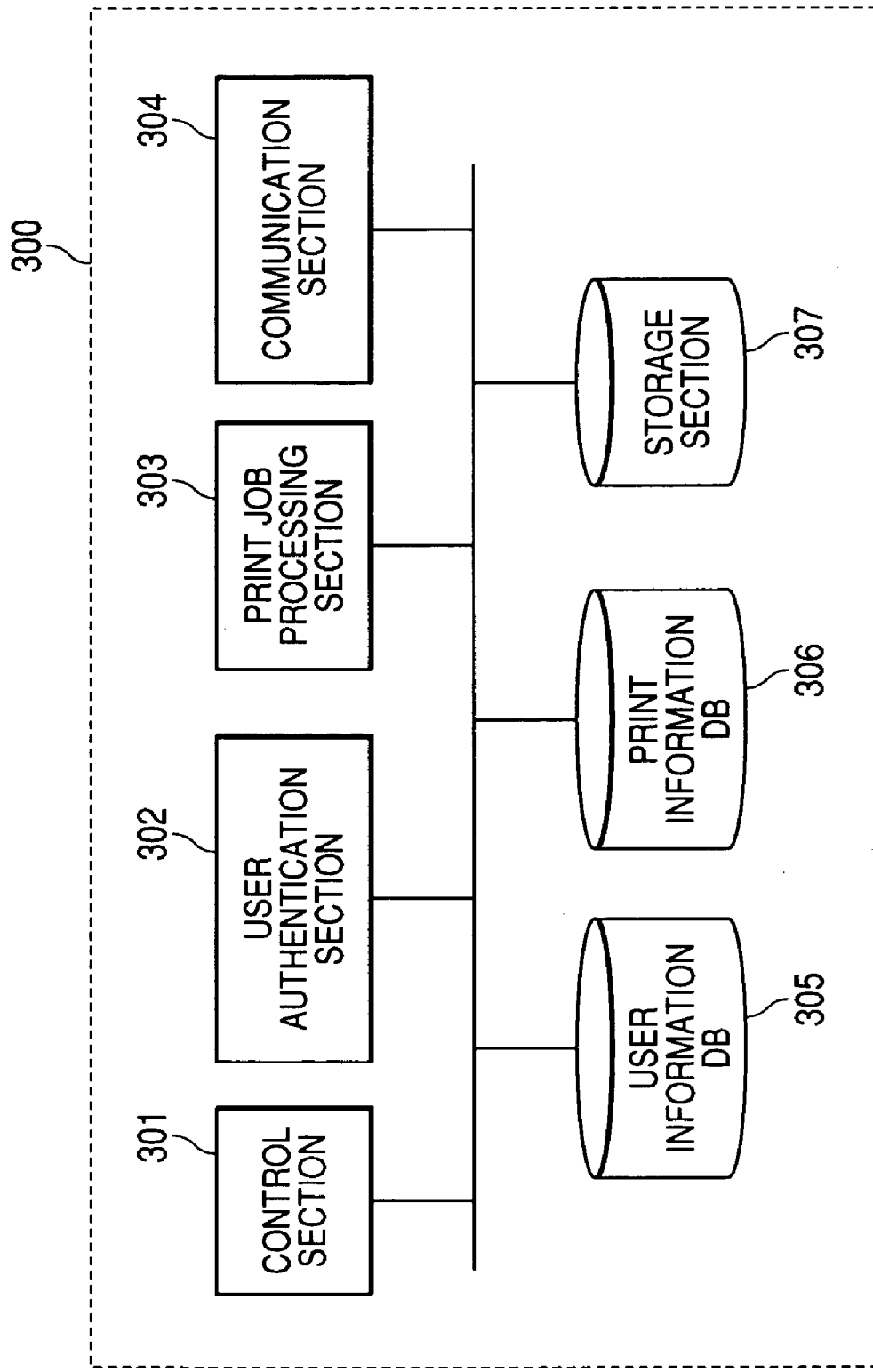
FIG. 3 is a block diagram to describe the configuration of a management server.

First, the configuration of the information output unit 200 and the configuration of the management server 300 will be discussed with reference to FIGS. 2 and 3. FIG. 2 shows the configuration of the information output unit 200 for executing printout. The information output unit 200 has a camera 201, a control section 202, a communication section 203, a display section 204, an input section 205, a storage section 206, and a printer 207.

The camera 201 takes a photograph of the print reception user 181. The control section 202 executes centralized processing control of various types of data processing, communication processing, and data transfer processing executed in the information output unit 200. Specifically, the control section 202 is implemented as a CPU, etc., for executing a program stored in the storage section 206. The communication section 203 executes data communication processing with the management server 300 through the network. The communication section 203 executes processing of transmitting the image data of the print reception user 181 photographed by the camera 201 to the management server 300, receives authentication result data from the management server 300, transmits print request information from the user to the management server 300, and receiving print data from the management server 300, and the like.

The display section 204 is a console panel, etc., for performing processing of presenting a screen for inquiring of the print reception user 181 whether or not to make a print request, displaying an error message when the user is not authenticated, and the like. The input section 205 is implemented as a keypad, etc., for the user to enter print request information, etc.

The storage section 206 is used as a storage area of various data processing programs, a storage area of print data, user information, etc., received from the management server 300, and the like. The printer 207 executes printout processing.

Next, the configuration of the management server 300 will be discussed with reference to FIG. 3. The management server 300 has a control section 301, a user authentication section 302, a print job processing section 303, a communication section 304, a user information database 305, a print information database 306, and a storage section 307.

The control section 301 executes centralized processing control of various types of data processing, communication processing, and data transfer processing executed in the management server 300. Specifically, the control section 301 is implemented as a CPU, etc., for executing a program stored in the storage section 307. The user authentication section 302 performs comparison processing between the face image data of the registered user, previously registered in the user information database 305 as check image data and the face image data received from the information output unit 200. If a match is found, the user authentication section 302 determines that the user is authenticated, and extracts the user ID.

The print job processing section 303 stores the print data corresponding to the print job in the print information database 306 together with the attribute data in response to print job issuance from the user terminal, and acquires print data from the print information database 306 in response to a print data request from the information output unit 200.

The communication section 304 executes communication processing with the user terminal and the information output unit 200 through the network. The communication section 304 receives a print job from the user terminal, receives the image data of the user photographed by the camera 201 from the information output unit 200, transmits authentication result data from the management server 300, receives print request information from the information output unit 200, and transmits print data from the management server 300, and the like.

The user IDs and the face image data of the users are stored in the user information database 305 in association with each other. The data corresponding to the print job issued from the user terminal is stored in the print information database 306 in association with the user ID of the print reception user 181.

FIGS. 4A and 4B show composition examples of stored data in the user information database 305 and the print information database 306. FIG. 4A shows the stored data in the user information database 305. As shown here, the user IDs of the users previously registered and the face image data of the users are stored in the user information database 305 in association with each other. When the user authentication section 302 conducts user authentication, the face image data of the user is applied as the comparison data with the image photographed by the camera, received from the information output unit 200.

FIG. 4B shows the stored data in the print information database 306. As shown here, the user IDs, the data corresponding to the print jobs issued by the users corresponding to the user IDs, and expiration date information of the print jobs are stored in the print information database 306. The print job processing section 303 selects print data in response to a print data request from the information output unit 200 and the selected print data is transmitted through the communication section 304 to the information output unit 200. The user ID stored in the print information database 306 is the ID of the recipient of the print data.

Next, the processing sequence from user detection of the camera of the information output unit 200 to completion of print processing will be discussed with reference to a flowchart of FIG. 5.

Figure 5:
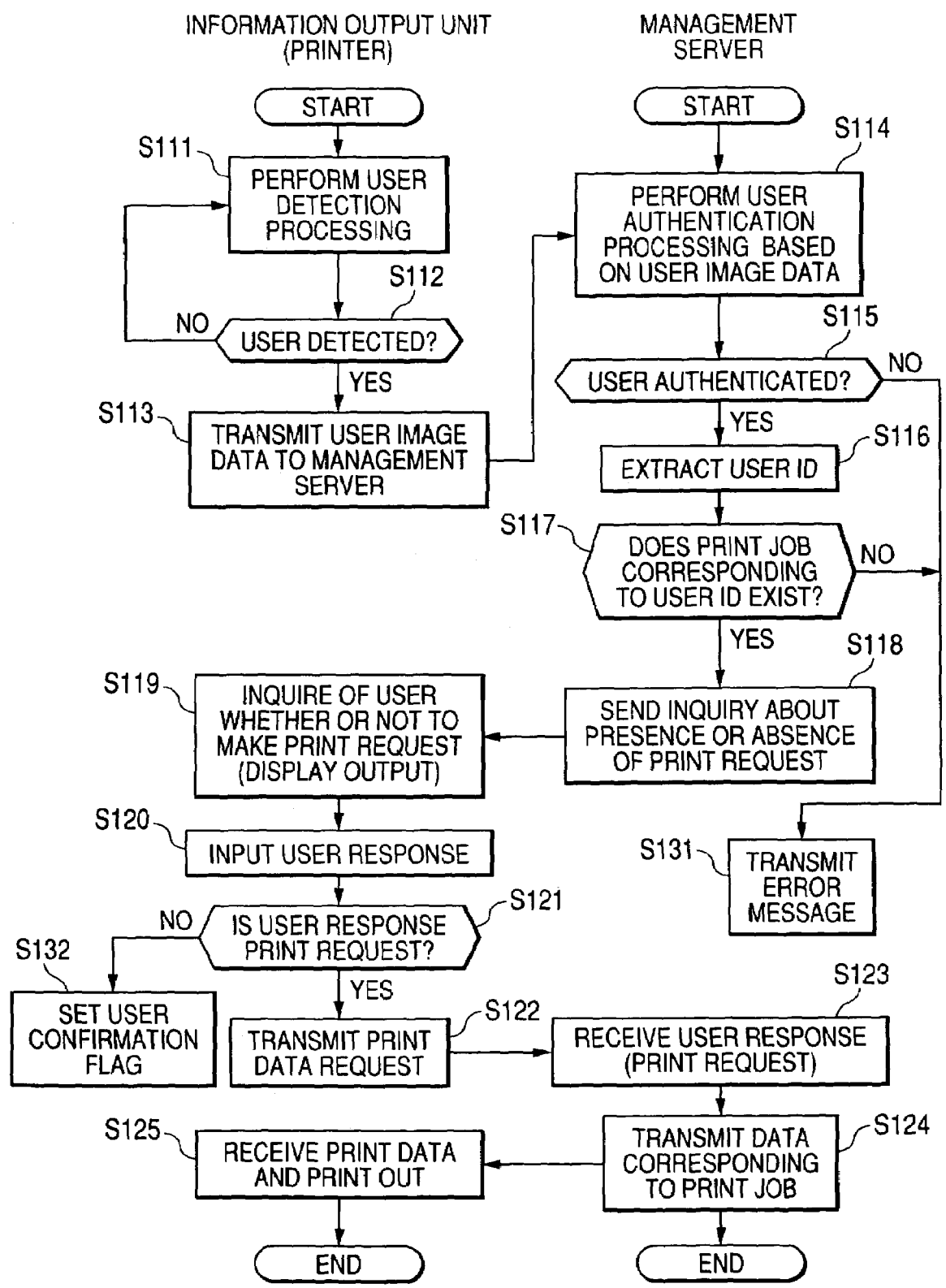
FIG. 5 is a flowchart to describe a processing sequence executed by the information output unit and the management server in the information output system of the invention.

The processing flowchart of FIG. 5 shows processing of the information output unit 200 at the left and processing of the management server 300 at the right. First, at step S111, the information output unit 200 executes detection processing of the user coming near the information output unit 200 by the attached camera 201. If the user is detected at step S112, the face image data of the user photographed by the camera 201 is transmitted to the management server 300 at step S113.

Upon reception of the face image data of the user from the information output unit 200, the management server 300 executes user authentication processing based on the user image data. The management server 300 sends the received face image information to the user authentication section 302 for executing face authentication service (see FIG. 3) in the management server 300, and requests the user authentication section 302 to compare the face image data with the registered face data stored in the user information database 305. If the face image data matches any of the registered image data stored in the user information database 305, the user authentication section 302 determines at step S115 that the user is authenticated, and extracts the user ID corresponding to the registered image data matching the received face image data at step S116. If no match is found, the user authentication section 302 repeats as many retries as the setup number of times. If the retries as many as the setup number of times end in failure (NO at step S115), an error message is transmitted to the information output unit 200. Alternatively, processing of making a transition to conventional network print service executing no user authentication may be performed. The detailed authentication sequence in the user authentication section 302 is described later with reference to FIG. 6, etc.

In the authentication processing of the user authentication section 302, if the registered image data matching the face image data received from the information output unit 200 exists in the user information database 305 and the identifier of the user (user ID) set in the registered data is extracted, the user ID is passed to the print job processing section 303 for executing print roaming service, and the print job processing section 303 searches the print information database 306 for the print job with the user ID specified as the print reception user.

The print job processing section 303 executes job search processing based on the user ID based on the registered data in the print information database 306 (see FIG. 4B) and checks whether or not the print job with the user specified as the print reception user exists. If the print job exists (YES at step S117), the management server 300 inquires of the information output unit 200 whether or not to make a print request at step S118.

At step S119, the information output unit 200 presents an inquiry screen for inquiring of the print reception user 181 whether or not to execute print in a print confirmation dialog of the console panel, and receives user's entry at step S120. If the print reception user 181 enters YES (YES at step S121), the information output unit 200 transmits a print data request to the management server 300 at step S122.

If the print reception user 181 enters NO (NO at step S121), the information output unit 200 sets a confirmed flag of the current user being tracked at step S132 and returns to the initial state. If it becomes impossible to detect a person from the camera image for a preset time or more, the information output unit 200 erases the dialog and returns to the initial state.

Upon reception of the print data request from the information output unit 200 at step S123, the print job processing section 303 of the management server 300 extracts the print data of the print job corresponding to the user ID of the authenticated user from the print information database 306 at step S124, and transmits the extracted print data to the information output unit 200. At S125, the information output unit 200 receives the print data from the management server 300 and prints out. As the processing is thus performed, the print reception user 181 can receive the printout data provided that the user is authenticated.

Figure 6:
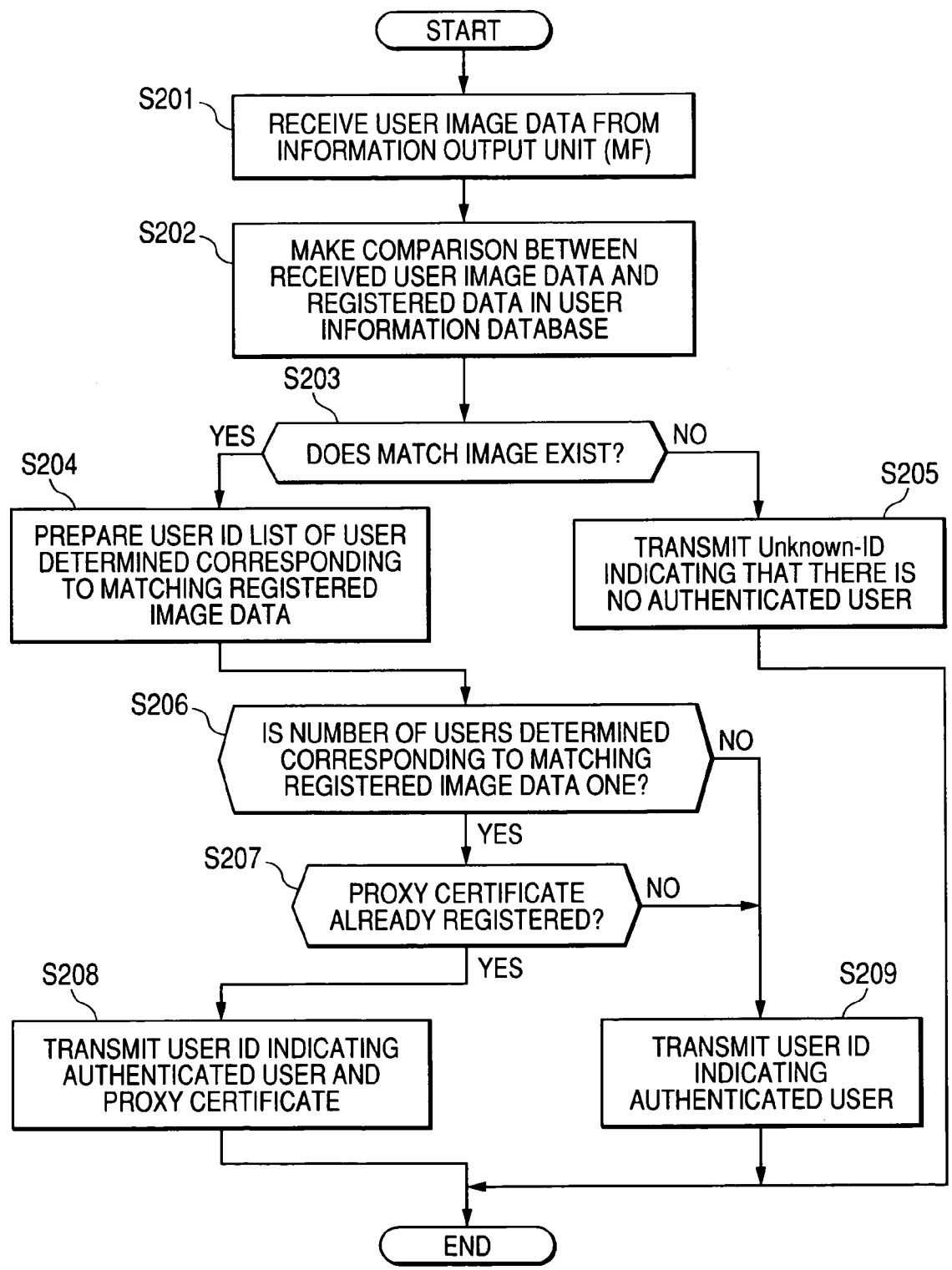
FIG. 6 is a flowchart to describe an authentication sequence executed in the management server.

Next, the details of the user authentication processing executed in the user authentication section 302 of the management server 300 will be discussed with reference to a flowchart of FIG. 6. At step S201, the user authentication section 302 of the management server 300 receives the image data of the user photographed by the camera 201 of the information output unit 200.

At step S202, the user authentication section 302 performs comparison processing between the image data of the user received from the information output unit 200 and the registered face data of the user information stored in the user information database 305 (see FIG. 4A). If there is no registered image data matching the user information stored in the user information database 305 (NO at step S203), the process goes to step S205. The management server 300 transmits Unknown-ID indicating that there is no authenticated user to the information output unit 200. If the information output unit 200 receives the Unknown-ID, it displays a message to the effect that the user is not authenticated in the UI of the console box of the display section 204.

On the other hand, if it is determined at step S203 that there is the registered image data matching the user information stored in the user information database 305 (YES at step S203), the process goes to step S204 and a user ID list of the user determined corresponding to the matching registered image data is prepared. The user authentication section 302 executes comparison processing based on the image data and may determine that the image data in the similarity range to an extent matches and may extract plural user IDs.

At step S206, whether or not one registered user is determined having the registered face image data matching the received face image is determined. If two or more registered users are determined having the registered face image data matching the received face image, the process goes to step S209 and a user ID list indicating the authenticated users is transmitted to the information output unit 200. The information output unit 200 executes user check according to a conventional system based on the received user ID list, for example, executes user check by requesting the user to enter the password corresponding to the user ID, etc., for identifying the user. The password information may be managed in the management server 300 as user information for checking the user-entered password from the information output unit 200 and transmitting the check result to the information output unit 200 or the password information may be stored in each information output unit to execute user check singly by the information output unit.

On the other hand, it is determined at step S206 that one registered user has the registered face image data matching the received face image (YES at step S206), whether or not proxy certificate as sign in profile for the registered user is registered is determined at step S207. The proxy certificate is a certificate that can be acquired as the user previously executes a predetermined authentication sequence with the management server 300. The proxy certificate is used as a certificate indicating that the user is authenticated, and is managed in association with the user ID in the user information database 305 of the management server 300. The acquisition processing sequence of the proxy certificate (sign in profile) is described later with reference to FIG. 7.

If it is determined at step S207 that proxy certificate for the registered user is registered, the process goes to step S208. The management server 300 acquires the user ID of the authenticated user and the proxy certificate (sign in profile) from the user information database 305 and transmits them to the information output unit 200. If it is not determined at step S207 that proxy certificate for the registered user is registered, the process goes to step S209. The management server 300 acquires the user ID of the authenticated user from the user information database 305 and transmits the user ID to the information output unit 200.

Next, the acquisition processing sequence of the proxy certificate by the user will be discussed with reference to FIG. 7. The proxy certificate is shown in detail in [RFC3820: Internet X.509 Public Key Infrastructure (PKI) Proxy Certificate Profile].

As described above, the proxy certificate is a certificate that can be acquired as the user previously executes a predetermined authentication sequence with the management server 300, and is a certificate indicating that the user is authenticated.

Figure 7:
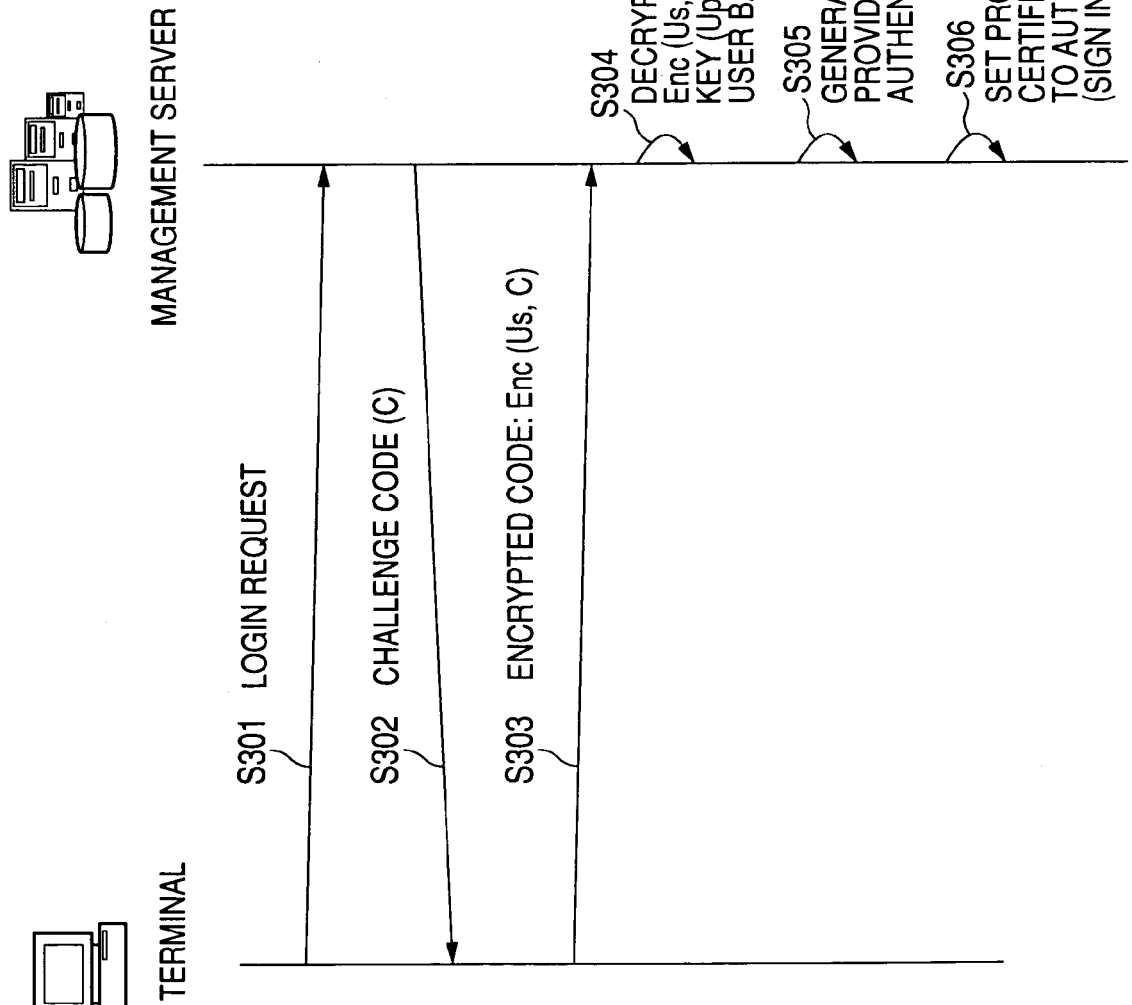
FIG. 7 is a sequence diagram to describe the authentication sequence between a user terminal and the management server executed in acquiring proxy certificate.

The user uses the user terminal to execute communications with the management server 300, as shown in FIG. 7. It is assumed that the user has public key Up and secret key Us corresponding to the user based on Public Key Infrastructure (PKI) and that public key certificate issued by Certificate Authority (CA) corresponding to the user public key Up is issued. The user authentication section 302 in the management server 300 executes the authentication sequence.

The user accesses the management server 300 using the user terminal and makes a login request at step S301. Upon reception of the login request from the user, the management server 300 generates challenge code (C) based on a random number and transmits the challenge code (C) to the user terminal at step S302.

At step S303, the user terminal applies the secret key Us corresponding to the user, executes encryption processing of the challenge code (C), generates encrypted code Enc (Us, C), and transmits the encrypted code to the management server 300. Enc (a, b) indicates encrypted data of data b using key a.

The management server 300 takes out the public key Up corresponding to the user from the public key certificate corresponding to the user, issued by the Certificate Authority (CA), applies the taken-out user public key Up, and executes decryption processing of the encrypted code Enc (Us, C) received from the user terminal. If challenge code C' provided as the decryption result matches the challenge code C transmitted by the management server 300, it is determined that the user has the effective key information, and the user is authenticated.

At step S305, proxy certificate is generated provided that the user is authenticated. The proxy certificate is formed as a certificate with electronic signature generated based on the secret key of the user management server for the user information data such as the user ID of the authenticated user, and can be checked for falsification based on the public key of the user management server. After the proxy certificate is determined a valid certificate by the check processing, the user ID is taken out and the authenticated user can be identified. A given expiration date is set in the proxy certificate.

At step S306, the management server 300 stores the proxy certificate in the user information database 305 in association with the user ID as the sign in profile corresponding to the user for management. FIG. 8 shows an example of storing the proxy certificate in the user information database 305. In the example shown in FIG. 8, the user IDs, the registered data of face images for user authentication, presence/absence information of registration of proxy certificate, and the proxy certificate if registered are stored.

Thus, the user previously executes the authentication sequence with the management server 300, whereby the proxy certificate in which the expiration date is set can be registered. The proxy certificate is sent to the information output unit 200 if the only one authenticated user is detected in the authentication sequence as previously described with reference to the flowchart of FIG. 6.

In the information output unit 200, signature check of the proxy certificate is executed for checking the certificate for validity and then the user ID is acquired from the certificate and the user ID of the authenticated user can be checked. The user ID is the user ID of the print reception user 181 (see FIG. 1). The information output unit 200 requests the management server 300 to send the print data corresponding to the print job with the user ID specified as the print recipient using the user ID as index data, receives the print data from the management server 300, and outputs the print data. As the processing is performed, it is made possible to provide the print data based on the reliable user authentication.

Thus, the user authentication is executed and the proxy certificate is issued and is managed in the management server 300, so that it is made possible to provide authentication data incorporating the proxy certificate in response to a user authentication request from each information output unit connected through the network. The proxy certificate may be used for any other purpose, for example, check processing of the access right, the write right to a file server, etc.

The user authentication section 302 can also perform authentication processing based on a request from an authentication requesting unit on the network other than the information output units and transmit a proxy certificate for enabling network access from the authentication requesting unit. The user authentication section 302 in the management server 300 can also be installed as a user authentication server using the user image on the network in separation from the print roaming function. To execute print roaming when such separation is made, an authentication request from the management server 300 is sent to the user authentication server and a proxy certificate is received from the user authentication server. Using the proxy certificate, a print job request of the user ID is sent to a print roaming server. The print roaming server is thus configured like other network resources, whereby system construction high in general versatility is facilitated.

Next, the processing sequences of (a) processing when a print job is received from any of the user terminals 121 to 123; and (b) processing of acquiring and transmitting print data from the print information database 306 in response to a request from the information output unit 200 as the processing of the management server 300 will be discussed with reference to FIGS. 9A and 9B. The print job processing section 303 of the management server 300 executes the processing sequences.

FIG. 9A is a flowchart to show the processing sequence when a print job is received from any of the user terminals 121 to 123. At step S501, the management server 300 receives a print job from the user terminal. The received data contains not only print data, but also print reception user specification information as the attribute data corresponding to the print data, for example, attribute information of the user ID, icon information capable of identifying the user, meta information, etc. Preferably, the management server 300 can deal with various protocols, it is made compatible with not only specific print protocols, but also FTP, Web data compatible protocols, etc.

At step S502, the management server 300 stores the received print job in the print information database 306 (see FIG. 4B) in association with the user ID, namely, the user ID of the print reception user.

Next, processing in FIG. 9B, namely, the processing sequence of acquiring and transmitting print data from the print information database 306 in response to a request from the information output unit 200 will be discussed.

At step S511, the management server 300 receives a user ID from the information output unit 200. The user ID is the user ID of the user authenticated in the management server 300 and the user ID of the print reception user 181 (see FIG. 1).

At step S512, the print job processing section 303 of the management server 300 acquires the print data stored in association with the user ID from the print information database 306 using the user ID as a key. At step S513, the management server 300 transmits the extracted data to the information output unit 200.

As the processing is thus performed, the print data is transmitted to the information output unit 200 where the authenticated print reception user 181 exists, and the print data output by the information output unit 200 is provided for the print reception user 181.

In the management server 300, the process for monitoring the expiration date is run on the background, a comparison is made between the expiration date of each job in the spool and the current time of day at regular time intervals, and if a job beyond the expiration date is found, the job is transferred by mail. In the mail transfer, whether or not the job is equal to or less the setup mail size is checked, and the print job contents are transferred to the recipient as an attached file. If the job exceeds the setup capacity, mail to the effect that the job is not attached and is canceled is sent to the transmitter and the recipient.

[Hardware Configuration Example]

Figure 10:
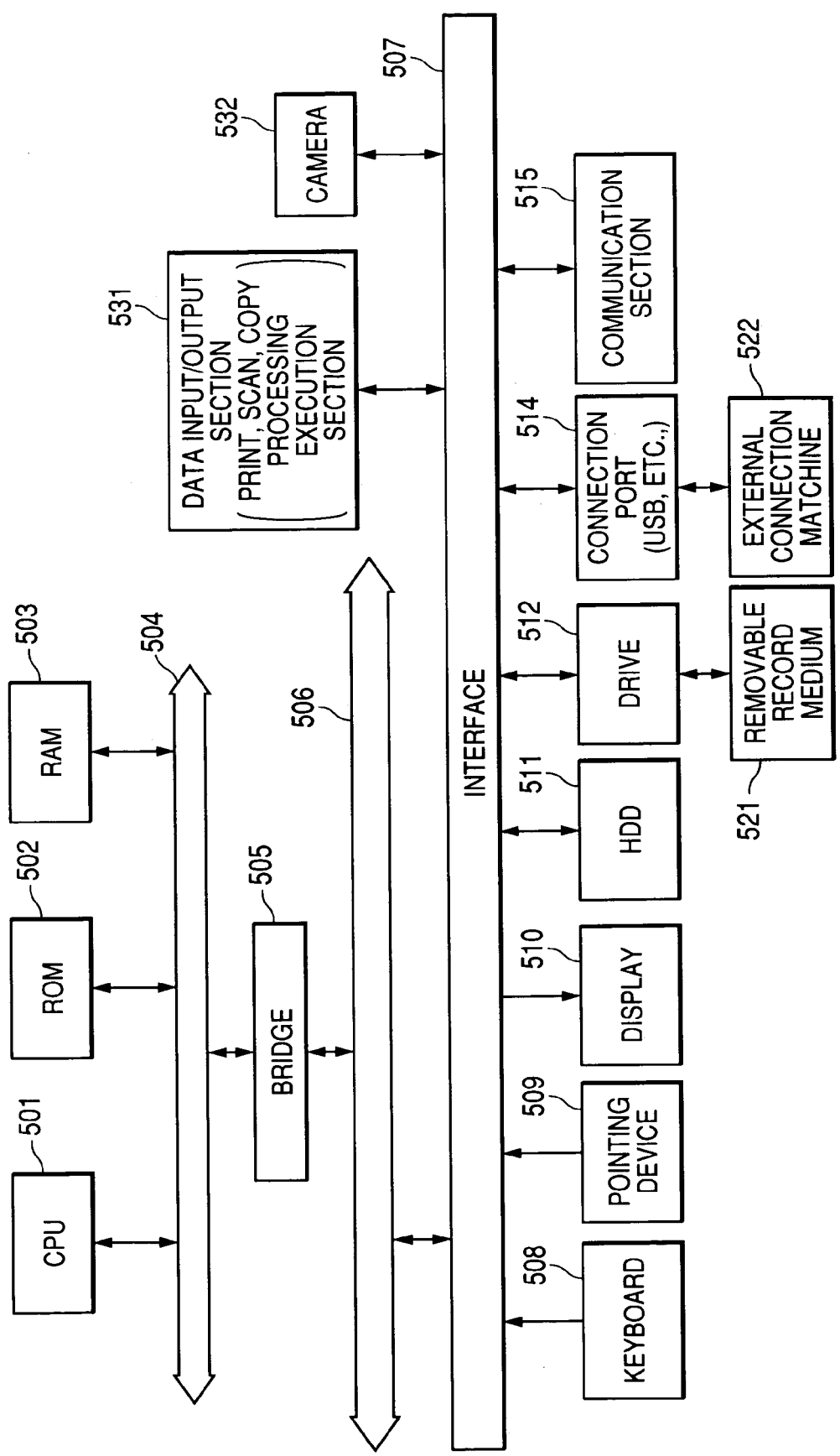
FIG. 10 is a block diagram to describe a hardware configuration example of the user terminal, the management server, and the information output unit making up the information output system of the invention.

Last, a hardware configuration example of an information processing apparatus for implementing the user terminal, the management server, the information output unit to execute the processing described above will be discussed with reference to FIG. 10. The hardware configuration shown in FIG. 10 is the configuration of a data processing section common to the user terminal, the management server, and the information output unit. A data input/output section 531 as a print, scan, copy processing function execution section and a camera 532 are components attached only to the information output unit. Other components are components common to the user terminal, the management server, and the information output unit.

A CPU (Central Processing Unit) 501 is a control section for executing processing complying with an OS (Operating System) and various computer programs describing the processing execution sequences of the user authentication processing, code analysis processing, etc., described above in the examples.

ROM (Read-Only Memory) 502 stores programs, operation parameters, etc., used by the CPU 501. RAM (Random Access Memory) 503 stores programs used in execution of the CPU 501 and parameters, etc., changed whenever necessary in the execution of the CPU 501. They are connected by a host bus 504 implemented as a CPU bus, etc.

The host bus 504 is connected to an external bus 506 such as a PCI (Peripheral Component Interconnect/Interface) bus via a bridge 505.

A keyboard 508 and a pointing device 509 are input devices operated by the user. A display 510 is implemented as a liquid crystal display, a CRT (Cathode Ray Tube), or the like for displaying various pieces of information and text as an image.

An HDD (Hard Disk Drive) 511 contains a hard disk and drives the hard disk for recording or playing back programs and information executed by the CPU 501. The hard disk can serve as the storage section 206 of the information output unit 200 shown in FIG. 2, the user information database 305, the print information database 306, the storage section 307 of the management server 300 shown in FIG. 3. Further, various computer programs such as various data processing programs are stored.

A drive 512 reads data or a program stored on a removable record medium 521 such as a magnetic disk, an optical disk, a magneto-optical disk, or semiconductor memory mounted, and supplies the data or the program to the RAM 503 connected via an interface 507, the external bus 506, the bridge 505, and the host bus 504. The removable record medium 521 can also serve as the storage section 206 of the information output unit 200 shown in FIG. 2, the user information database 305, the print information database 306, the storage section 307 of the management server 300 shown in FIG. 3 like the hard disk.

A connection port 514 is a port for connecting an external connection machine 522 and has a connection section of USB, IEEE1394, etc. The connection port 514 is connected to the CPU 501, etc., via the interface 507, the external bus 506, the bridge 505, the host bus 504, etc. A communication section 515 is connected to the network for executing external data communication processing.

The hardware configuration example of the information processing apparatus shown in FIG. 10 is one apparatus example incorporating the basic PC configuration. The information processing apparatus of each of the user terminal, the management server, and the information output unit applied in the system of the invention is not limited to the configuration shown in FIG. 10 and may adopt any configuration if the processing described above in the examples can be executed.

Figure 11:
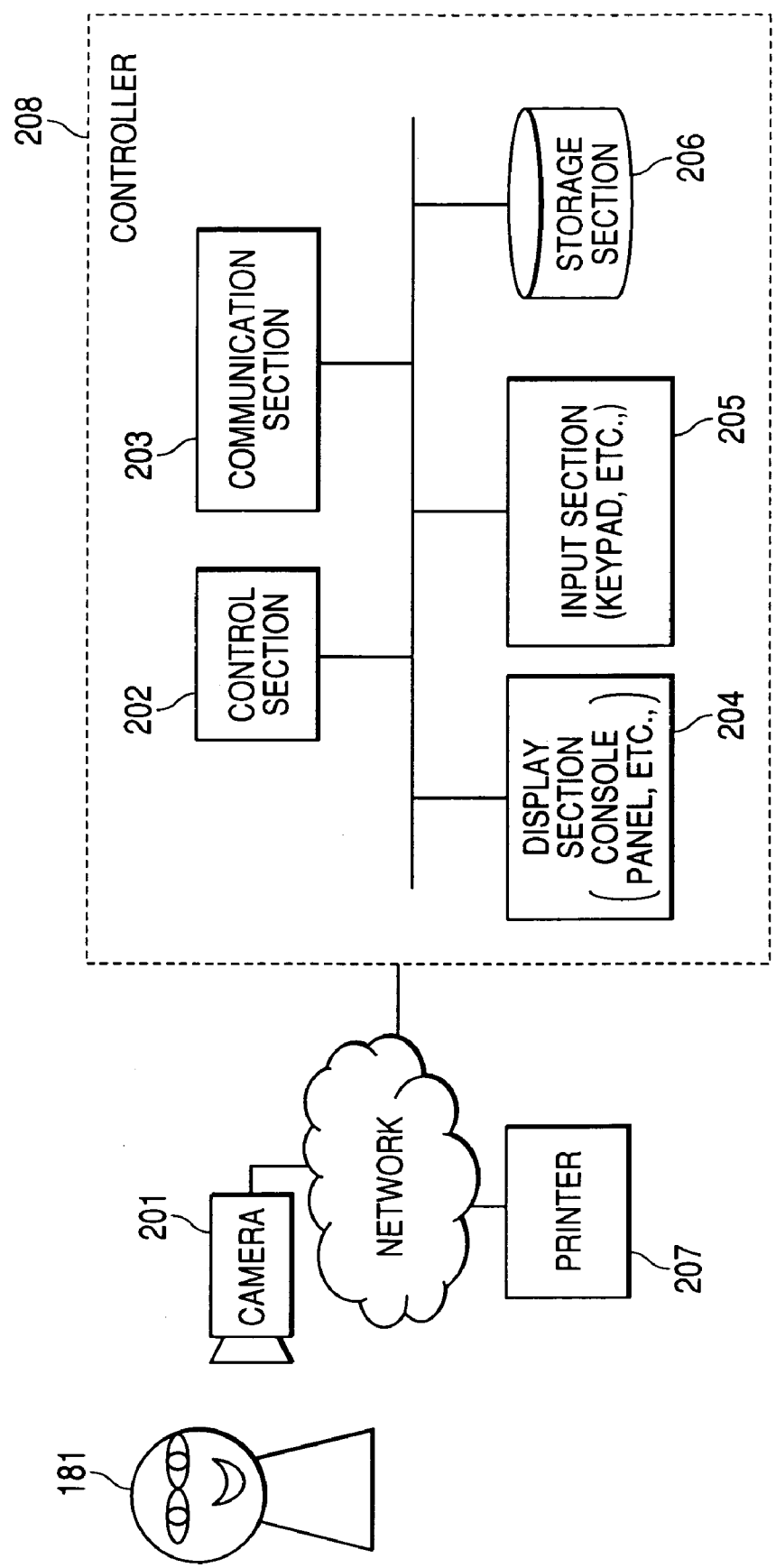
FIG. 11 is a drawing to show a configuration example wherein a controller such as a PC, a camera, and a printer are connected through a network.

For example, some or all of the functions of the control section 202, the communication section 203, the display section 204, the input section 205, and the storage section 206 of the components of the information output unit 200 previously described with reference to FIG. 2 can also be separated to form a controller 208 by a PC, etc., as shown in FIG. 11. The printer 207, the camera 201, and the controller 208 are connected through the network and both or either of the printer 207 and the camera 201 is controlled by the controller 208. Therefore, the data transfer between the information output unit 200 and the management server 300 described above is executed by the controller 208 in such a configuration example. In this case, as the process for printing out the print job stored in the print information database 306 of the management server 300, the portion executed by the information output unit 200 in the process shown in FIG. 5, 6, 7, or 9B may be replaced with the controller 208. However, since the printer 207 is a separate body, the print job corresponding to the user ID obtained from the proxy certificate received is first transmitted from the management server 300 to the controller 208 and then the controller 208 causes the printer 207 to execute print processing.

To implement the controller as an apparatus that can be used in multiple applications, such as a PC, the proxy certificate can also be used for authentication of the access right to any other network service as described above, so that it can be used more effectively than the case where the controller is implemented as a controller dedicated to a printer or a camera.

If the management server 300 can make a user image authentication request, transmit a print job directly to the information output unit 200 (or the printer 202 under the control of the controller 208), and directly cause it to execute printout (for example, lpq print instruction), the proxy certificate need not necessarily be transmitted to the information output unit 200 (or the controller 208), and the authentication process using the proxy certificate may be skipped. However, when the management server 300 can use network service requiring authentication other than print as described above, if the proxy certificate is issued and is used at the user image authentication time, likewise it becomes easy to make the management server 300 (or the controller 208) multifunctional.

While the invention has been described in detail in its specific examples, it is to be understood that modifications will be apparent to those skilled in the art without departing from the spirit and the scope of the invention. That is, the invention is disclosed for illustrative purposes only and it is to be understood that the invention is not limited to the specific examples thereof except as defined in the claims.

The processing sequence described in the specification can be executed by both or either of hardware and software. To execute software processing, the program recording the processing sequence can be installed in memory in a computer incorporated in dedicated hardware for execution or can be installed in a general-purpose computer that can execute various types of processing for execution.

For example, the program can be previously recorded on a hard disk or in ROM (Read-Only Memory) as a record medium or can be stored (recorded) temporarily or permanently on a removable record medium such as a flexible disk, a CD-ROM (Compact Disk Read-Only Memory), an MO (Magneto Optical) disk, a DVD (Digital Versatile Disk), a magnetic disk, or semiconductor memory. Such a removable record medium can be provided as a package software product.

The various types of processing described in the specification may be executed not only in time sequence according to the description, but also in parallel or individually in response to the processing capability of the apparatus for executing the processing or as required. The system in the specification is a logical set made up of plural units (apparatus) and is not limited to a set of units (apparatus) housed in a single cabinet.

INDUSTRIAL APPLICABILITY

As described above, according to the configuration of the invention, the user terminal transmits a print job specifying the print reception user of the print data recipient to the management server, and the management server manages the print job in association with the user identifier of the print reception user. User image information is acquired by the camera included in the information output unit and is transmitted to the management server. The management server executes user authentication based on comparison processing between the received user image information and the registered user image information stored in the database. Provided that the user is authenticated, the print job data with the authenticated user set as the print reception user is transmitted to the information output unit, which then executes printout. Thus, the user need not bear the password, etc., in mind or carry a card or the like storing the identification information of the user ID, etc., and it is made possible to authenticate the user based on the face image data of the user and printout based on the user authentication is made possible.

Further, according to the configuration of the invention, when a print job is issued, the data specifying the print reception user is transmitted to the management server, and the management server manages the identification data of the print reception user and the print job data in association with each other and whether or not output is enabled is determined based on authentication of the print reception user. Thus, the user different from the user issuing the print job is set as the print job user and output is executed based on authentication, so that the print data can be reliably provided for the user specified at the print job issuing time.

Further, according to the configuration of the invention, the management server executes user authentication and issues and manages the proxy certificate, so that it is made possible to provide the authentication data incorporating the proxy certificate in response to a user authentication request received from each printer connected through the network.

Further, in one embodiment of the information output system of the invention, the user information database in the management server stores the user identifiers and the registered user image information in association with each other and the print information database stores the user identifiers and the print job data in association with each other, the user authentication section acquires the user identifier of the user authenticated based on the user image information comparison processing from the user information database, and the print job processing section executes processing of acquiring the print job data stored in the print information database in association with the user identifier acquired by the user authentication section and transmitting the print job data to the information output unit.

Further, in one embodiment of the information output system of the invention, if the authenticated user in the user authentication section is detected, the management server inquires of the information output unit whether or not to execute print processing, the information output unit presents an inquiry screen for requesting the user to make a response based on the inquiry received from the management server and transmitting a user response as user's entry information to the management server, and if the user response is a print processing request, the management server transmits the print job data to the information output unit.

Further, in one embodiment of the information output system of the invention, the user authentication section executes issuance processing of a proxy certificate as a certificate certifying authentication information of the user and provided that the user is authenticated based on an authentication sequence containing determination of validity of key information issued to the user, executes the proxy certificate issuance processing and stores and manages the proxy certificate in the user information database in association with the user identifier of the user.

Further, in one embodiment of the information output system of the invention, if the proxy certificate registered in association with the authenticated user in the authentication processing based on the user image information received from the information output unit exists, the user authentication section executes processing of transmitting the proxy certificate to the information output unit.

Further, in one embodiment of the information output system of the invention, the information output unit has a printer for executing printout responsive to the print job, a camera for acquiring user image information, and a controller for controlling the printer and executing transmission processing of the user image information acquired through the camera to the management server, the printer, the camera, and the controller being connected through the network, and if the proxy certificate registered in association with the authenticated user in the authentication processing based on the user image information received from the controller exists, the management server executes processing of transmitting the proxy certificate to the controller.

Further, in one embodiment of the information output system of the invention, the information output unit executes processing of transmitting the user image information acquired by the camera to the management server as encrypted data.

In one embodiment of the information output unit of the invention, further, provided that the user identifier of the authenticated user is received from the management server, an inquiry screen for inquiring whether or not to execute print processing is presented to the user in the data input/output section as the user interface and transmitting a user response as user's entry information to the management server.

In one embodiment of the information output unit of the invention, further, processing of transmitting the user image information acquired by the camera to the management server as encrypted data is executed.

In one embodiment of the information processing apparatus of the invention, the user information database stores the user identifiers and the registered user image information in association with each other and the print information database stores the user identifiers and the print job data in association with each other, the user authentication section acquires the user identifier of the user authenticated based on the user image information comparison processing from the user information database, and the print job processing section executes processing of acquiring the print job data stored in the print information database in association with the user identifier acquired by the user authentication section and transmitting the print job data to the information output unit.

In one embodiment of the information processing apparatus of the invention, further, if the authenticated user in the user authentication section is detected, the information processing apparatus inquires of the information output unit whether or not to execute print processing, and if the user response from the information output unit is a print processing request, the print job processing section transmits the print job data to the information output unit.

In one embodiment of the information processing apparatus of the invention, the user authentication section executes issuance processing of a proxy certificate as a certificate certifying authentication information of the user and provided that the user is authenticated based on an authentication sequence containing determination of validity of key information issued to the user, executes the proxy certificate issuance processing and stores and manages the proxy certificate in the user information database in association with the user identifier of the user.

In one embodiment of the information processing apparatus of the invention, if the proxy certificate registered in association with the authenticated user in the authentication processing based on the user image information received from the information output unit exists, the user authentication section executes processing of transmitting the proxy certificate to the information output unit.

In one embodiment of the information processing method of the invention, the information processing method further has the step of presenting an inquiry screen for inquiring whether or not to execute print processing to the user in a data input/output section as a user interface and transmitting a user response as user is entry information to the management server provided that the user identifier of the authenticated user is received from the management server.

In one embodiment of the information processing method of the invention, the image data transmission step is a step of executing processing of transmitting the user image information acquired by the camera to the management server as encrypted data.

In one embodiment of the information processing method of the invention, the user information database stores the user identifiers and the registered user image information in association with each other and the print information database stores the user identifiers and the print job data in association with each other, the user authentication step executes processing of acquiring the user identifier of the user authenticated based on the user image information comparison processing from the user information database, and the print job data transmission step is a step of executing processing of acquiring the print job data stored in the print information database in association with the user identifier acquired in the user authentication step and transmitting the print job data to the information output unit.

In one embodiment of the information processing method of the invention, the information processing method further has an inquiry step of inquiring of the information output unit whether or not to execute print processing if the authenticated user is detected in the user authentication step, wherein if the user response from the information output unit is a print processing request, the print job data transmission step is to transmit the print job data to the information output unit.

In one embodiment of the information processing method of the invention, the information processing method further has a proxy certificate issuance step of executing issuance processing of a proxy certificate as a certificate certifying authentication information of the user, wherein the proxy certificate issuance step has the steps of executing proxy certificate generation processing provided that the user is authenticated based on an authentication sequence containing determination of validity of key information issued to the user, and storing the proxy certificate in the user information database in association with the user identifier of the user.

In one embodiment of the information processing method of the invention, the information processing method further has the step of, if the proxy certificate registered in association with the authenticated user in the user authentication step based on the user image information received from the information output unit exists, executing processing of transmitting the proxy certificate to the information output unit.

In one embodiment of the information processing method of the invention, the information output unit has a printer for executing printout responsive to the print job, a camera for acquiring user image information, and a controller for controlling the printer and executing transmission processing of the user image information acquired through the camera to the management server, the printer, the camera, and the controller being connected through the network, and the information processing method further has the step of, if the proxy certificate registered in association with the authenticated user in authentication processing based on the user image information received from the controller exists, executing processing of transmitting the proxy certificate to the controller.

The computer program of the invention is a computer program that can be provided by a storage medium or a communication medium in computer-readable format for a computer system that can execute various program codes, for example, such as a record medium of a CD, FD, MO, etc., for example.

Such a program is provided in the computer-readable format, whereby processing responsive to the program is carried out in a computer system.

The above and other objects, features, and advantages of the invention will be apparent from the following detailed description of the examples of the invention in conjunction with the accompanying drawings. The system in the specification is a logical set made up of plural units (apparatus) and is not limited to a set of units (apparatus) housed in a single cabinet.

According to the configuration of the invention, the user terminal transmits a print job specifying the print reception user of the print data recipient to the management server, and the management server manages the print job in association with the user identifier of the print reception user. User image information is acquired by the camera included in the information output unit and is transmitted to the management server. The management server executes user authentication based on comparison processing between the received user image information and the registered user image information stored in the database. Provided that the user is authenticated, the print job data with the authenticated user set as the print reception user is transmitted the information output unit, which then executes printout. Thus, the user need not bear the password, etc., in mind or carry a card or the like storing the identification information of the user ID, etc., and it is made possible to authenticate the user based on the face image data of the user and printout based on the user authentication is made possible.

Further, according to the configuration of the invention, when a print job is issued, the data specifying the print reception user is transmitted to the management server, and the management server manages the identification data of the print reception user and the print job data in association with each other and whether or not output is enabled is determined based on authentication of the print reception user. Thus, the user different from the user issuing the print job is set as the print job user and output is executed based on authentication, so that the print data can be reliably provided for the user specified at the print job issuing time.

Further, according to the configuration of the invention, the management server executes user authentication and issues and manages the proxy certificate, so that it is made possible to provide the authentication data incorporating the proxy certificate in response to a user authentication request received from each printer connected through the network.

The entire disclosure of Japanese Patent Application No. 2004-318939 filed on Nov. 2, 2004 including specification, claims, drawings, and abstract is incorporated herein by reference in its entirety.

What is claimed is:

1. An information output system comprising:
a user terminal that issues a print job containing print data;
a management server that receives and stores the print job issued by the user terminal; and
an information output unit that acquires print data from the management server and executes printout,
wherein the user terminal, the management server, and the information output unit are connected through a network,
wherein the user terminal transmits a print job specifying a print reception user of a print data recipient to the management server,
wherein the information output unit includes:
a camera that acquires user image information;

a communication section that transmits the user image information acquired by the camera to the management server; and
a print section that executes printout,
wherein the management server includes:
a print job processing section that stores and manages the print job received from the user terminal in a print information database in association with a user identifier of the print reception user; and
a user authentication section that receives the user image information from the information output unit and executes user authentication based on comparison processing between the received user image information and registered user image information associated with a registered user stored in a user information database, and
wherein provided that the user is authenticated in the user authentication section, the print job processing section executes processing of acquiring print job data with the authenticated user set as the print reception user from the print information database and of transmitting the print job data to the information output unit.

2. The information output system as claimed in claim 1,
wherein the user information database in the management server stores the user identifiers and the registered user image information in association with each other,
wherein the print information database stores the user identifiers and the print job data in association with each other,
wherein the user authentication section acquires the user identifier of the user authenticated based on the user image information comparison processing from the user information database, and
wherein the print job processing section executes processing of acquiring the print job data stored in the print information database in association with the user identifier acquired by the user authentication section and of transmitting the print job data to the information output unit.

3. The information output system as claimed in claim 1,
wherein if the authenticated user in the user authentication section is detected, the management server inquires of the information output unit whether or not to execute print processing,
wherein the information output unit presents an inquiry screen that requests the user to make a response based on the inquiry received from the management server and transmits a user response as user's entry information to the management server, and
wherein if the user response is a print processing request, the management server transmits the print job data to the information output unit.

4. The information output system as claimed in claim 1,
wherein the user authentication section executes issuance processing of a proxy certificate as a certificate certifying authentication information of a user, executes the proxy certificate issuance processing provided that the user is authenticated based on an authentication sequence containing determination of validity of key information issued to the user, and stores and manages the proxy certificate in the user information database in association with the user identifier of the user.

5. The information output system as claimed in claim 4,
wherein if the proxy certificate registered in association with the authenticated user in the authentication processing based on the user image information received from the information output unit exists, the user authentication section executes processing of transmitting the proxy certificate to the information output unit.

6. The information output system as claimed in claim 1,
wherein the information output unit includes:
a printer that executes printout responsive to the print job;
a camera that acquires user image information; and
a controller that controls the printer and executes transmission processing of the user image information acquired through the camera to the management server,
wherein the printer, the camera, and the controller are connected through the network,
wherein if the proxy certificate registered in association with the authenticated user in the authentication processing based on the user image information received from the controller exists, the management server executes processing of transmitting the proxy certificate to the controller.

7. The information output system as claimed in claim 1,
wherein the information output unit executes processing of transmitting the user image information acquired by the camera to the management server as encrypted data.

8. An information output unit comprising:
a control section that executes data processing;
a camera that acquires user image information;
a communication section that executes data communications;
a print section that executes printout; and
a data input/output section as a user interface,
wherein the information output unit is connected to a management server through a network,
the control section transmits the user image information acquired by the camera to the management server,
if a user identifier of a user who is authenticated by the management server based on the transmitted user image information is received from the management server, the control section sends a request for acquiring print job data with the user identifier set as a print recipient to the management server, and executes output processing of the print job data received from the management server based on the request through the print section.

9. The information output unit as claimed in claim 8,
wherein further, provided that the user identifier of the authenticated user is received from the management server, an inquiry screen that inquires whether or not to execute print processing is presented to the user in the data input/output section as the user interface, and a user response as user's entry information is transmitted to the management server.

10. The information output unit as claimed in claim 8,
wherein further, processing of transmitting the user image information acquired by the camera to the management server as encrypted data is executed.

11. An information processing apparatus as a management server that receives a print job from a user terminal connected to the information processing apparatus through a network, and transmits print job data to an information output unit connected to the information processing apparatus through the network, the information processing apparatus comprising:
a print job processing section that stores and manages the print job received from the user terminal in a print information database in association with a user identifier of a print reception user; and
a user authentication section that receives user image information from the information output unit and executes user authentication based on comparison processing between the received user image information and registered user image information associated with a registered user stored in a user information database, wherein provided that the user is authenticated in the user authentication section, the print job processing section executes processing of acquiring print job data with the authenticated user set as the print reception user from the print information database and of transmitting the print job data to the information output unit.

12. The information processing apparatus as claimed in claim 11, wherein the user information database stores the user identifiers and the registered user image information in association with each other, wherein the print information database stores the user identifiers and the print job data in association with each other, wherein the user authentication section acquires the user identifier of the user authenticated based on the user image information comparison processing from the user information database, and wherein the print job processing section executes processing of acquiring the print job data stored in the print information database in association with the user identifier acquired by the user authentication section and of transmitting the print job data to the information output unit.

13. The information processing apparatus as claimed in claim 11, wherein further, if the authenticated user in the user authentication section is detected, the information processing apparatus inquires of the information output unit whether or not to execute print processing, and wherein if the user response from the information output unit is a print processing request, the print job processing section transmits the print job data to the information output unit.

14. The information processing apparatus as claimed in claim 11, wherein the user authentication section executes issuance processing of a proxy certificate as a certificate certifying authentication information of a user, executes the proxy certificate issuance processing provided that the user is authenticated based on an authentication sequence containing determination of validity of key information issued to the user, and stores and manages the proxy certificate in the user information database in association with the user identifier of the user.

15. The information processing apparatus as claimed in claim 14, wherein if the proxy certificate registered in association with the authenticated user in the authentication processing based on the user image information received from the information output unit exists, the user authentication section executes processing of transmitting the proxy certificate to the information output unit.

16. An information processing method performed by a processer in an information output unit comprising:

acquiring user image information by a camera that acquires user image information;

transmitting the acquired user image information to a management server connected to an information output unit through a network;

if a user identifier of a user that is authenticated by the management server based on the transmitted user information is received from the management server, sending a request for acquiring print job data with the user identifier set as a print recipient to the management server; and executing printout processing of the print job data received from the management server based on the request.

17. The information processing method as claimed in claim 16, further comprising:

presenting an inquiry screen that inquires whether or not to execute print processing to the user in a data input/output section as a user interface, provided that the user identifier of the authenticated user is received from the management server; and transmitting a user response as user's entry information to the management server.

18. The information processing method as claimed in claim 16, wherein the transmitting the acquired user image information is executing processing of transmitting the user image information acquired by the camera to the management server as encrypted data.

19. An information processing performed by a processor in an information processing apparatus as a management server that receives a print job from a user terminal connected to the information processing apparatus through a network and transmits print job data to an information output unit connected to the information processing apparatus through the network, the information processing method comprising:

storing and managing the print job received from the user terminal in a print information database in association with a user identifier of a print reception user;

receiving user image information from the information output unit;

executing user authentication based on comparison processing between the received user image information and registered user image information associated with a registered user stored in a user information database;

acquiring print job data with the authenticated user set as the print reception user from the print information database, provided that the user is authenticated in the executing user authentication; and transmitting the print job data to the information output unit.

20. The information processing method as claimed in claim 19, wherein the user information database stores the user identifiers and the registered user image information in association with each other, and the print information database stores the user identifiers and the print job data in association with each other, wherein the executing user authentication is executing processing of acquiring the user identifier of the user authenticated based on the user image information comparison processing from the user information database, and wherein the transmitting the print job data is executing processing of acquiring the print job data stored in the print information database in association with the user identifier acquired by the executing user authentication and transmitting the print job data to the information output unit.

21. The information processing method as claimed in claim 19, further comprising:

inquiring of the information output unit whether or not to execute print processing, if the authenticated user is detected in the executing user authentication, wherein if the user response from the information output unit is a print processing request, the transmitting the print job data is transmitting the print job data to the information output unit.

22. The information processing method as claimed in claim 19, further comprising:

executing issuance processing of a proxy certificate as a certificate certifying authentication information of a user, wherein the executing issuance processing of the proxy certificate includes:

executing proxy certificate generation processing provided that the user is authenticated based on an authentication sequence containing determination of validity of key information issued to the user; and storing the proxy certificate in the user information database in association with the user identifier of the user.

23. The information processing method as claimed in claim 22, further comprising:

executing processing of transmitting the proxy certificate to the information output unit, if the proxy certificate registered in association with the authenticated user in the executing user authentication based on the user image information received from the information output unit exists.

24. The information processing method as claimed in claim 19, further includes:

executing processing of transmitting the proxy certificate to the controller, if the proxy certificate registered in association with the authenticated user in authentication processing based on the user image information received from the controller exists, wherein the information output unit includes:

a printer that executes printout responsive to the print job;

a camera that acquires user image information; and a controller that controls the printer and executes transmission processing of the user image information acquired through the camera to the management server, wherein the printer, the camera, and the controller are connected through the network.

25. A storage medium readable by a computer, the storage medium storing a program of instructions executable by the computer to perform a function for executing information processing in an information output unit that acquires print data from a management server connected to the information output unit through a network and executes printout, the function comprising the steps of:

acquiring user image information by a camera that acquires user image information;

transmitting the acquired user image information to the management server connected to the information output unit through a network;

if a user identifier of a user that is authenticated by the management server based on a the transmitted user information is received from the management server, sending a request for aquiring print job data with the user identifier set as a print recipient to the management server; and executing printout processing of the print job data received from the management server based on the request.

26. A storage medium readable by a computer, the storage medium storing a program of instructions executable by the computer to perform a function for executing information processing in an information processing apparatus as a management server that receives a print job from a user terminal connected to the information processing apparatus through a network and transmits print job data to an information output unit connected to the information processing apparatus through the network, the function comprising the steps of:

storing and managing the print job received from the user terminal in a print information database in association with a user identifier of a print reception user;

receiving user image information from the information output unit;

executing user authentication based on comparison processing between the received user image information and registered user image information associated with a registered user stored in a user information database;

acquiring print job data with the authenticated user set as the print reception user from the print information database, provided that the user is authenticated in the executing user authentication; and transmitting the print job data to the information output unit.

* * * * *